(12) United States Patent
Arakawa

(10) Patent No.: US 9,164,611 B2
(45) Date of Patent: Oct. 20, 2015

(54) DISPLAY INPUT DEVICE, AND IMAGE FORMING APPARATUS INCLUDING TOUCH PANEL PORTION

(71) Applicant: KYOCERA Document Solutions Inc., Osaka (JP)

(72) Inventor: Hiroki Arakawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 279 days.

(21) Appl. No.: 13/853,932

(22) Filed: Mar. 29, 2013

(65) Prior Publication Data

US 2013/0265251 A1     Oct. 10, 2013

(30) Foreign Application Priority Data

Apr. 10, 2012   (JP) .................................. 2012-089111

(51) Int. Cl.
   *G06F 3/048*    (2013.01)
   *G06F 3/041*    (2006.01)
   *G06F 3/0481*   (2013.01)
   (Continued)

(52) U.S. Cl.
   CPC .............. *G06F 3/041* (2013.01); *G06F 3/0486* (2013.01); *G06F 3/0488* (2013.01); *G06F 3/04812* (2013.01); *G06F 3/04817* (2013.01); *G06F 2203/04808* (2013.01)

(58) Field of Classification Search
   CPC ..................... G06F 3/0482; G06F 2203/04808; G06F 3/04817; G06F 3/04812
   See application file for complete search history.

(56) References Cited

U.S. PATENT DOCUMENTS

2002/0059288 A1 * 5/2002 Yagi et al. ...................... 707/102
2004/0104894 A1 * 6/2004 Tsukada et al. ................ 345/168
2005/0104867 A1 * 5/2005 Westerman et al. .......... 345/173
(Continued)

FOREIGN PATENT DOCUMENTS

EP      2169528 A2      3/2010
JP      2001356878 A    12/2001
(Continued)

OTHER PUBLICATIONS

European Patent Office, Extended European Search Report of EP13162510.5, Jul. 17, 2013, Germany, 9 pages.
(Continued)

*Primary Examiner* — Michael J Eurice
(74) *Attorney, Agent, or Firm* — Alleman Hall McCoy Russell & Tuttle LLP

(57) ABSTRACT

A display input device includes a display portion and a touch panel portion. When an object to be transferred is determined by touching two points on the touch panel portion, the display portion displays transfer destination designation information indicating which object is designated as a transfer destination among objects that can be a transfer destination of the object to be transferred. When the touch panel portion has accepted a transfer destination switching operation performed while one or more of the two touched points keep being touched, the display portion switches the object designated as a transfer destination by the transfer destination designation information. After the display portion has displayed the transfer destination designation information, when the touching operation has been released, the touch panel portion accepts the object designated as a transfer destination when the touching operation has been released, as a transfer destination of the object to be transferred.

12 Claims, 11 Drawing Sheets

(51) Int. Cl.
*G06F 3/0488* (2013.01)
*G06F 3/0486* (2013.01)

(56) References Cited

U.S. PATENT DOCUMENTS

| | | | |
|---|---|---|---|
| 2008/0036743 A1* | 2/2008 | Westerman et al. | 345/173 |
| 2008/0168403 A1* | 7/2008 | Westerman et al. | 715/863 |
| 2009/0102809 A1* | 4/2009 | Mamba et al. | 345/173 |
| 2009/0327975 A1* | 12/2009 | Stedman | 715/863 |
| 2010/0073303 A1 | 3/2010 | Wu et al. | |
| 2010/0090971 A1* | 4/2010 | Choi et al. | 345/173 |
| 2011/0010672 A1* | 1/2011 | Hope | 715/841 |
| 2011/0072373 A1* | 3/2011 | Yuki | 715/764 |
| 2011/0072394 A1* | 3/2011 | Victor | 715/821 |
| 2011/0102458 A1* | 5/2011 | Takiguchi et al. | 345/629 |
| 2011/0163968 A1* | 7/2011 | Hogan | 345/173 |
| 2011/0185321 A1* | 7/2011 | Capela et al. | 715/863 |
| 2011/0302519 A1* | 12/2011 | Fleizach et al. | 715/773 |
| 2011/0316790 A1* | 12/2011 | Ollila et al. | 345/173 |
| 2011/0317195 A1* | 12/2011 | Mitsui et al. | 358/1.13 |
| 2012/0030569 A1* | 2/2012 | Migos et al. | 715/702 |
| 2012/0050192 A1 | 3/2012 | Kobayashi | |
| 2012/0249440 A1* | 10/2012 | Yi et al. | 345/173 |

FOREIGN PATENT DOCUMENTS

| | | |
|---|---|---|
| JP | 2007094763 A | 4/2007 |
| JP | 2009104268 A | 5/2009 |
| JP | 2010271982 A | 12/2012 |
| TW | M424539 U1 | 3/2012 |

OTHER PUBLICATIONS

Kuno, Y. et al., "'Throw Icon' User Interface, Computer Software Cormorant Ware," Japan Society for Software Science and Technology, vol. 13, No. 3, pp. 38-48, May 1996, 12 pages.

European Patent Office, Office Action Issued in European Patent Application No. 13162510.5, Apr. 23, 2015, Germany, 8 pages.

* cited by examiner

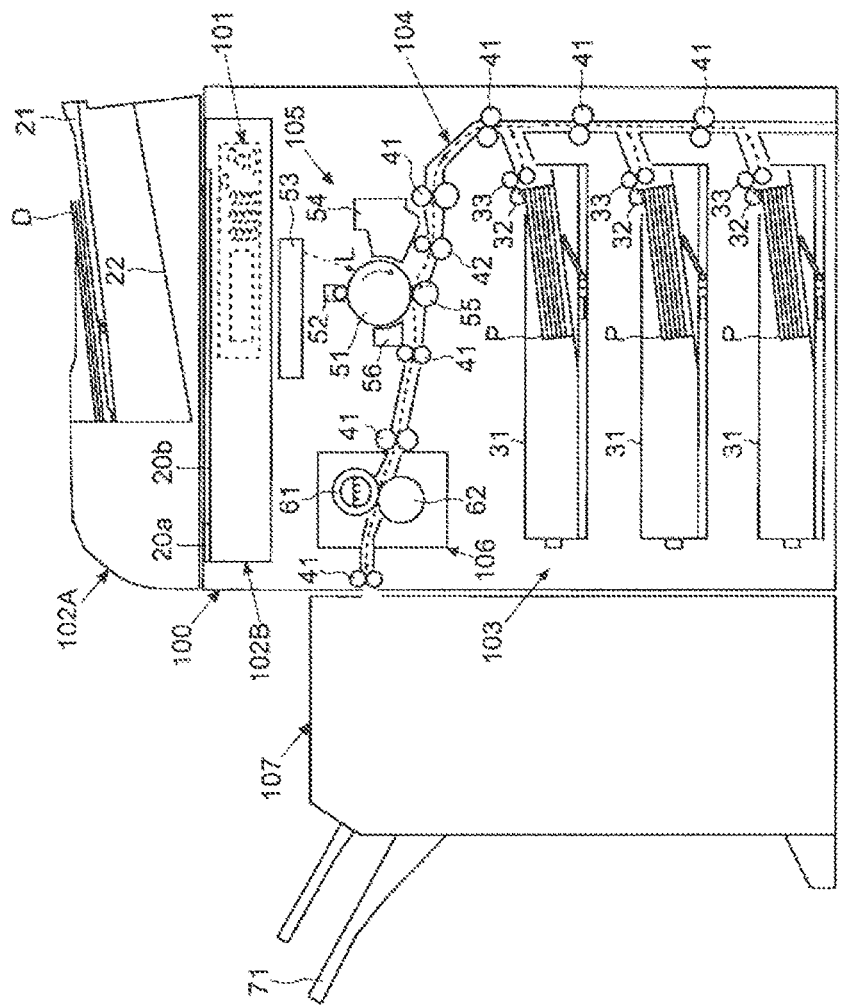
F I G. 1

DISPLAY INPUT DEVICE, AND IMAGE FORMING APPARATUS INCLUDING TOUCH PANEL PORTION

INCORPORATION BY REFERENCE

This application is based upon and claims the benefit of priority from the corresponding Japanese Patent Application No. 2012-089111 filed on Apr. 10, 2012, the entire contents of which are incorporated herein by reference.

BACKGROUND

The present disclosure relates to a display input device and an image forming apparatus including a touch panel portion.

Conventionally, an image forming apparatus is known that has a function referred to as a box function, in addition to a copy function, a scan function, a fax function, and the like. It is noted that the box function is a function of storing image data in a storage area referred to as a box registered in advance, thereby allowing printing based on the stored image data. In general, the image forming apparatus includes a display input device that accepts an instruction to select a function to be used among a plurality of types of functions, an instruction to perform setting of the function to be used, and the like.

The display input device of the image forming apparatus may have provided thereon, besides a hardware key and the like, a display portion with a touch panel, on which a software key is displayed. Such a display input device displays software keys for accepting various settings on the display portion, and detects a software key touched via the touch panel, based on the output from the touch panel.

For example, when the box function is selected as a function to be used, the display input device (the display portion with the touch panel) displays an object (hereinafter, referred to as a folder icon) having a hierarchic structure and representing a registered box. Thus, by touching the display position of a folder icon representing a desired box, a user can cause the display portion to display an object (hereinafter, referred to as a file icon) representing image data stored in the desired box. In addition, a user can also transfer a file icon located under a certain folder icon to a location under another folder icon.

For example, in order to transfer a file icon, a user touches two points at a display position of the file icon to be transferred on the touch panel, and then takes off both fingers from the touch panel. As a result, a control portion of the display input device determines the file icon displayed at the position where the two points have been touched, as a transfer target. Next, the user touches two points at a display position of a folder icon as a transfer destination, on the touch panel. In response to the touching operation, the control portion of the display input device determines the folder icon displayed at the position where the two points have been touched, as the transfer destination, and transfers the file icon as a transfer target, to the folder icon as the transfer destination.

SUMMARY

A display input device according to one aspect of the present disclosure includes a display portion and a touch panel portion. The display portion displays a screen on which a plurality of objects are provided, the plurality of objects including an object to be transferred, and an object having a hierarchic structure such that the object to be transferred can be transferred and located thereunder. The touch panel portion detects a plurality of touched positions on the screen that a user is touching. In addition, while the display portion is displaying the plurality of objects, when two points are touched at a display position of the object on the touch panel portion the object to be transferred has been determined, the display portion displays transfer destination designation information indicating which object is designated as a transfer destination among the objects that can be a transfer destination of the object to be transferred. Further, when the touch panel portion has accepted a transfer destination switching operation which is a touching operation performed while one or more of the two touched points keep being touched, the display portion switches the object to be designated as a transfer destination by the transfer destination designation information. Meanwhile, after the display portion has displayed the transfer destination designation information, when the touching operation has been released, the touch panel portion accepts that the object having been designated as a transfer destination by the transfer destination designation information at the time when the touching operation has been released, has been determined as a transfer destination of the object to be transferred.

An image forming apparatus according to another aspect of the present disclosure includes a display portion and a touch panel portion. The display portion displays a screen on which a plurality of objects are provided, the plurality of objects including an object to be transferred, and an object having a hierarchic structure such that the object to be transferred can be transferred and located thereunder. The touch panel portion detects a plurality of touched positions on the screen that a user is touching. In addition, while the display portion is displaying the plurality of objects, when two points are touched at a display position of the object on the touch panel portion the object to be transferred has been determined, the display portion displays transfer destination designation information indicating which object is designated as a transfer destination among the objects that can be a transfer destination of the object to be transferred. Further, when the touch panel portion has accepted a transfer destination switching operation which is a touching operation performed while one or more of the two touched points keep being touched, the display portion switches the object to be designated as a transfer destination by the transfer destination designation information. Meanwhile, after the display portion has displayed the transfer destination designation information, when the touching operation has been released, the touch panel portion accepts that the object having been designated as a transfer destination by the transfer destination designation information at the time when the touching operation has been released, has been determined as a transfer destination of the object to be transferred.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 is a schematic diagram of an image forming apparatus including a display input device according to an embodiment of the present disclosure.

DETAILED DESCRIPTION

[Entire Configuration of Image Forming Apparatus]

Figure 2:
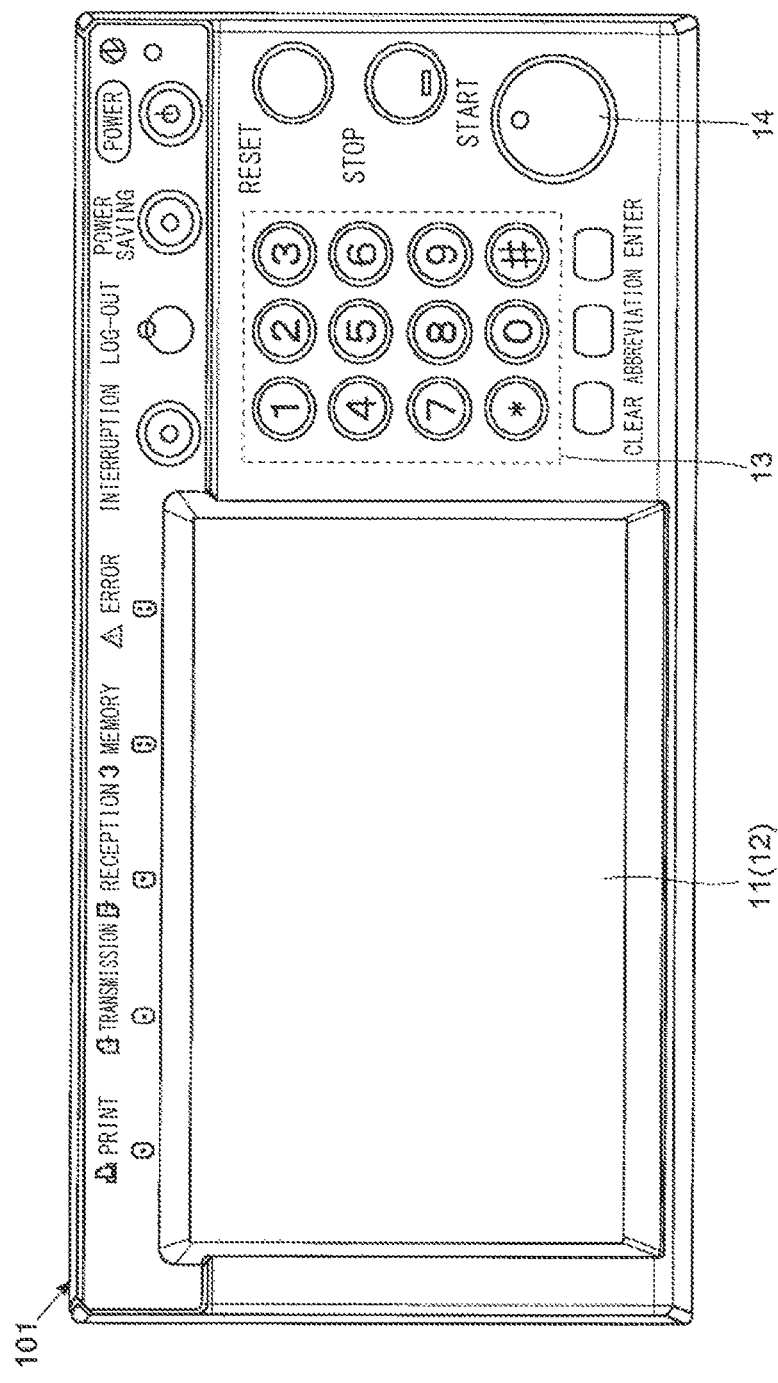
FIG. 2 is a detail diagram of the display input device of the image forming apparatus shown in FIG. 1.

Hereinafter, an image forming apparatus (multifunction peripheral) capable of executing a plurality of types of functions such as a copy function, a transmission (scan) function, a fax function, and a box function will be described as an example.

As shown in FIG. 1, an image forming apparatus 100 of the present embodiment includes an operation panel 101 (corresponding to a "display input device"), a document sheet conveying portion 102A, an image reading portion 102B, a sheet feed portion 103, a paper sheet conveying portion 104, an image forming portion 105, a fixing portion 106, a post-processing portion 107, and the like.

The operation panel 101 is, for example, provided on the front surface side of the apparatus. As shown in FIG. 2, the operation panel 101 has a liquid crystal display portion 12 (corresponding to a "display portion"). A touch panel portion 11 is provided on the display surface of the liquid crystal display portion 12. The touch panel portion 11 is a multi-touch panel capable of, when a user has touched a plurality of positions on the display surface of the liquid crystal display portion 12, detecting the plurality of touched positions at the same time. The liquid crystal display portion 12 displays a screen on which, for example, a message and/or a software key that accepts an input operation (touching operation) from a user are provided. It is noted that the screen displayed on the liquid crystal display portion 12 will be described later in detail. The touch panel portion 11 covering the display surface of the liquid crystal display portion 12 is provided for detecting a software key designated by a user (a software key touched by a user via the touch panel portion 11). In addition, the operation panel 101 has provided thereon hardware keys such as a numeric keypad 13 that accepts a numeric input and/or a start key 14 that accepts an instruction to start function execution.

Returning to FIG. 1, the document sheet conveying portion 102A is openable and closable via a rotation shaft (not shown) provided on the apparatus back surface side of the image reading portion 102B. The document sheet conveying portion 102A draws a document sheet D set on a document sheet set tray 21, causes the document sheet D to pass on conveying reading contact glass 20a, and discharges the document sheet D to the document sheet discharge tray 22. In addition, the document sheet conveying portion 102A also has a function of pressing the document sheet D placed on placement reading contact glass 20b.

The image reading portion 102B reads the document sheet D to generate image data. In the image reading portion 102B, optically-relevant members such as an exposure lamp, a mirror, a lens, and an image sensor are provided though not shown. The image reading portion 102B radiates light onto the document sheet D passing on the conveying reading contact glass 20a or the document sheet D placed on the placement reading contact glass 20b. Then, the image reading portion 102B performs A/D conversion for an output value of the image sensor receiving light reflected from the document sheet D, thereby generating image data. Thus, the image forming apparatus 100 can perform printing based on the image data obtained by a reading operation (scanning) of the document sheet D performed by the image reading portion 102B. In addition, the image forming apparatus 100 can also store the image data obtained by the scanning.

The sheet feed portion 103 has a plurality of cassettes 31 which contain paper sheets P, and supplies the paper sheets P contained in the plurality of cassettes 31 to the paper sheet conveying portion 104. In the sheet feed portion 103, pick-up rollers 32 that draw the contained paper sheets P, and separation roller pairs 33 that prevent the paper sheets P from being conveyed redundantly are provided.

The paper sheet conveying portion 104 conveys the paper sheet P inside the image forming apparatus 100. Specifically, the paper sheet P supplied from the sheet feed portion 103 is conveyed by the paper sheet conveying portion 104, whereby the paper sheet P passes through the image forming portion 105 and the fixing portion 106 in this order. In the paper sheet conveying portion 104, a plurality of conveying roller pairs 41 that convey the paper sheet P are provided. Further, in the paper sheet conveying portion 104, a registration roller pair 42 is also provided that causes the paper sheet P to stand by just before the image forming portion 105 and conveys the paper sheet P to the image forming portion 105 at a predetermined timing.

The image forming portion 105 forms a toner image based on image data, and transfers the toner image onto the paper sheet P. The image forming portion 105 includes a photosensitive drum 51, a charging device 52, an exposure device 53, a developing device 54, a transfer roller 55, a cleaning device 56, and the like.

In a forming process of a toner image and a transfer process of the toner image, first, the photosensitive drum 51 is rotationally driven, and the surface of the photosensitive drum 51 is charged at a predetermined potential by the charging device 52. In addition, the exposure device 53 outputs a light beam L based on image data, thereby scanning and exposing the surface of the photosensitive drum 51 with the light beam L. Thus, an electrostatic latent image is formed on the surface of the photosensitive drum 51. The developing device 54 supplies toner to the electrostatic latent image formed on the surface of the photosensitive drum 51, thereby developing an image.

The transfer roller 55 can be rotated while pressing the surface of the photosensitive drum 51. Further, a predetermined voltage is applied to the transfer roller 55. In this state, the registration roller pair 42 causes the paper sheet P to proceed between the transfer roller 55 and the photosensitive drum 51 at a predetermined timing. Thus, the toner image on the surface of the photosensitive drum 51 is transferred onto the paper sheet P. Then, after the transfer process of the toner image is finished, the cleaning device 56 eliminates residual toner on the surface of the photosensitive drum 51.

The fixing portion 106 heats and pressurizes the toner image transferred onto the paper sheet P, thereby fixing the toner image on the paper sheet P. The fixing portion 106 includes a fixing roller 61 having a heat generation source, and a pressure roller 62 to be pressed to the fixing roller 61. The paper sheet P on which the toner image has been transferred passes between the fixing roller 61 and the pressure roller 62, whereby the paper sheet P is heated and pressed. Thus, the toner image is fixed on the paper sheet P, and the printing is completed.

The post-processing portion 107 receives the printed paper sheet P from the fixing portion 106, and performs post-processing such as sorting processing, stapling processing, and punching processing, for the paper sheet P. Then, after performing the post-processing for the printed paper sheet P, the post-processing portion 107 discharges the paper sheet P to a discharge tray 71.

[Hardware Configuration of Image Forming Apparatus]

Figure 3:
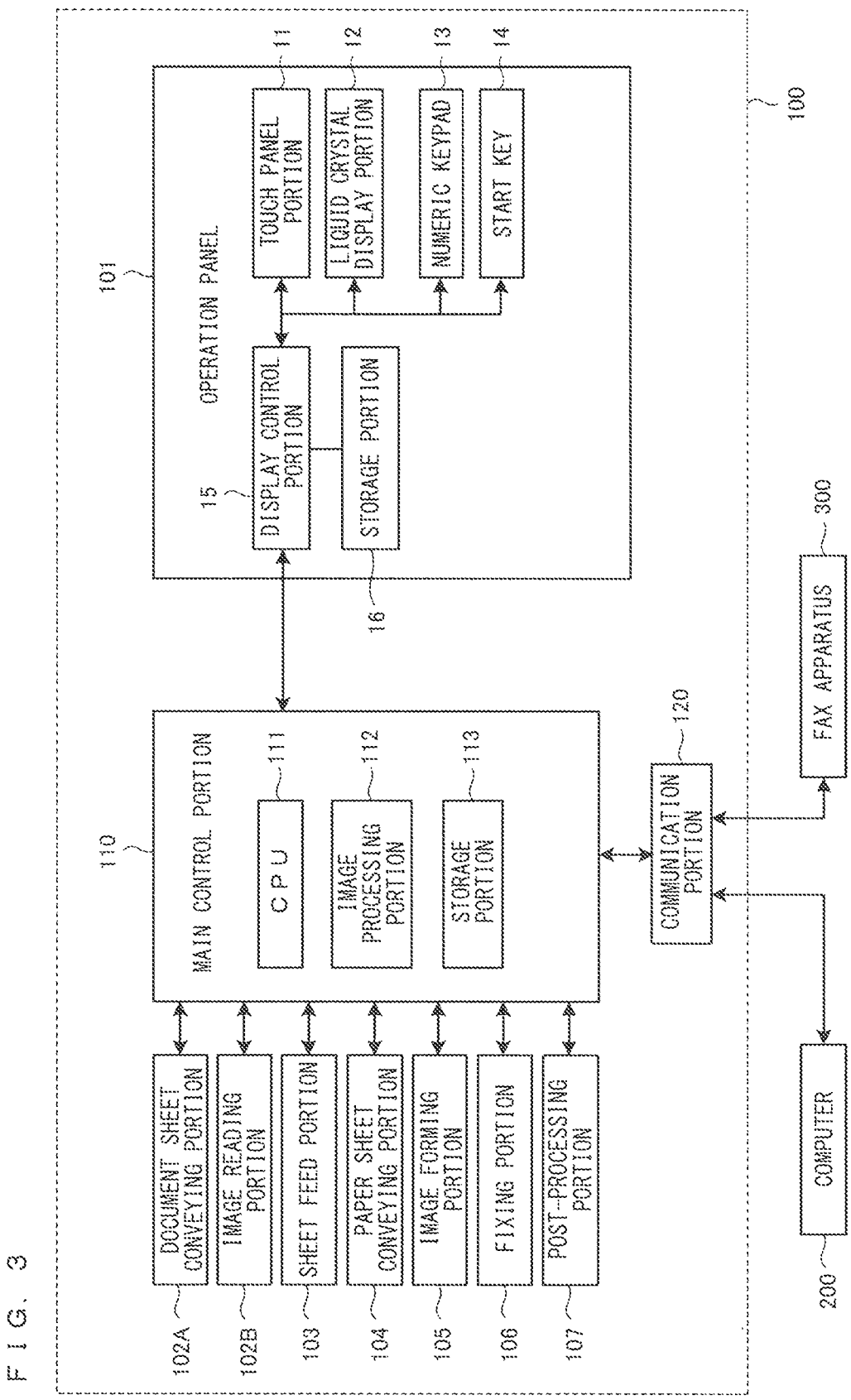
FIG. 3 is a block diagram showing the hardware configuration of the image forming apparatus shown in FIG. 1.

The image forming apparatus 100 includes a main control portion 110 as shown in FIG. 3. The main control portion 110 includes a CPU 111 which is a central processing unit, an image processing portion 112, and a storage portion 113. The image processing portion 112 has a dedicated ASIC for image processing, a memory, and the like, and performs various image processes (such as expansion/reduction, density conversion, and data form conversion) for image data. The storage portion 113 has a ROM, a RAM, an HDD, and the like. For example, a program and data needed for executing a function are stored in the ROM, and the program and the data are expanded on the RAM.

The main control portion 110 is connected to the document sheet conveying portion 102A, the image reading portion 102B, the sheet feed portion 103, the paper sheet conveying portion 104, the image forming portion 105, the fixing portion 106, the post-processing portion 107, and the like. The main control portion 110 performs overall control, image processing control, driving control for a motor that rotates each rotational body, and the like, based on the program and the data stored in the storage portion 113.

The operation panel 101 is also connected to the main control portion 110. The operation panel 101 includes a display control portion 15 connected to the main control portion 110. The display control portion 15 has a CPU and the like, and receives an instruction from the main control portion 110, to control the display operation of the operation panel 101. For example, when a user has touched a software key displayed on the liquid crystal display portion 12 via the touch panel portion 11, the display control portion 15 detects the coordinates of the touched position based on the output of the touch panel portion 11. That is, the display control portion 15 detects the software key touched via the touch panel portion 11 by the user (the software key designated by the user). A storage portion 16 is connected to the display control portion 15. Data indicating the correspondence between the output of the touch panel portion 11 and the coordinates of the touched positions is stored in the storage portion 16. As another embodiment, it is conceivable that the main control portion 110 also has the function of the display control portion 15 of the operation panel 101 so that the main control portion 110 controls the touch panel portion 11, the liquid crystal display portion 12, and the like.

In addition, the main control portion 110 is connected to a communication portion 120. The communication portion 120 is, for example, connected in a communicable manner to an external computer 200 via a network. Thus, the image forming apparatus 100 can perform printing based on image data transmitted from the computer 200, and also transmit image data obtained by scanning to the computer 200. In addition, the communication portion 120 may have a modem, and in this case, the image forming apparatus 100 can perform fax communication with an external fax apparatus 300 via a network such as a telephone line.

[Display Screen of Operation Panel]

Figure 4:
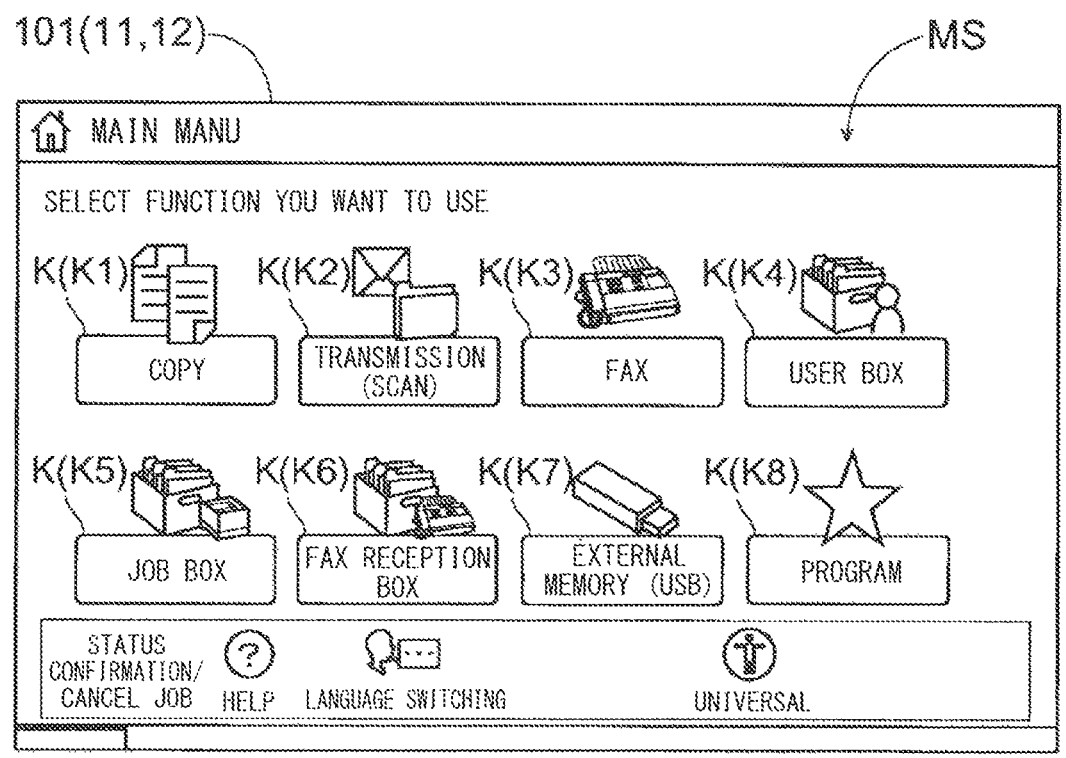
FIG. 4 is a diagram showing an example of a screen (main menu screen) displayed on the display input device of the image forming apparatus shown in FIG. 1.

When the main power supply of the operation panel 101 is turned on, the operation panel 101 displays, as an initial screen, a main menu screen MS as shown in FIG. 4. On the main menu screen MS, a plurality of software keys K respectively corresponding to a plurality of types of functions are provided for accepting, from a user, an instruction to select a function to be executed among a plurality of functions.

On the main menu screen MS, when a user has selected a function to be executed, the operation panel 101 displays a screen that accepts instructions such as a setting instruction about the selected function. Specifically, when a display position of one of the plurality of software keys K is touched via the touch panel portion 11 by a user, the operation panel 101 displays a screen that accepts instructions such as a setting instruction about a function corresponding to the software key K.

Figure 5:
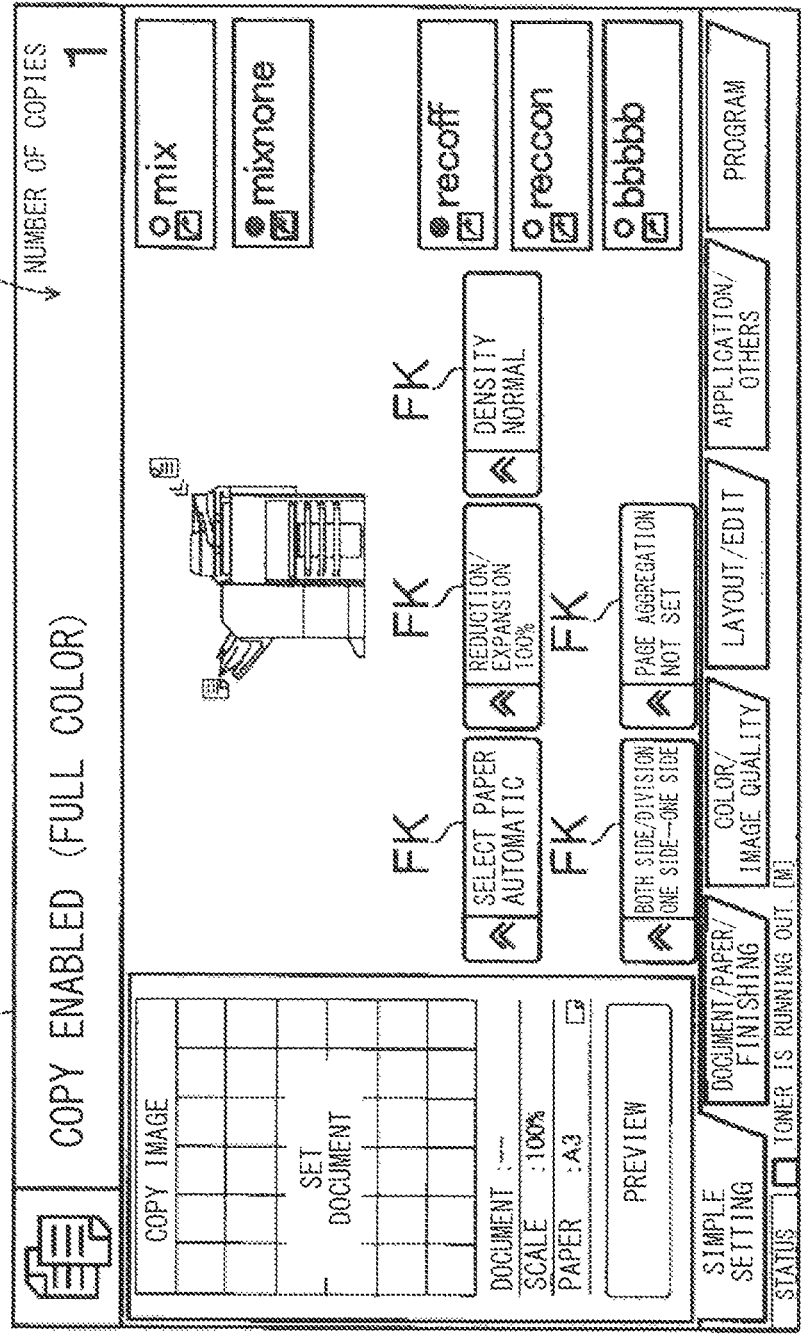
FIG. 5 is a diagram showing an example of a screen (setting screen of a copy function) displayed on the display input device of the image forming apparatus shown in FIG. 1.

For example, when a display position of a software key K1 is touched via the touch panel portion 11 by a user, the operation panel 101 displays a setting screen SSC (see FIG. 5) that accepts a setting instruction for a setting value of a copy function. On the setting screen SSC of the copy function, a plurality of setting keys FK respectively corresponding to a plurality of setting items whose setting values can be changed for execution of the copy function, are provided. FIG. 5 shows the setting screen SSC on which, as an example, a plurality of setting keys FK respectively corresponding to setting items of paper selection, reduction/expansion, density, both side/division, and page aggregation are provided. On the plurality of setting keys FK, the current setting values of the corresponding setting items are indicated. When one of the plurality of setting keys FK is touched via the touch panel portion 11 by a user, the operation panel 101 displays, for example, a screen (not shown) that allows a user to set the setting value of the setting item corresponding to the designated setting key FK. Thus, the user can recognize the current setting values of the plurality of setting items about the copy function, and can change each setting value.

In addition, when a display position of a software key K2 is touched via the touch panel portion 11 by a user, the operation panel 101 displays a setting screen (not shown) that accepts a setting instruction for the setting values of the transmission (scan) function. In addition, when a display position of a software key K3 is touched via the touch panel portion 11 by a user, the operation panel 101 displays a setting screen (not shown) that accepts a setting instruction for the setting values of the fax function. It is noted that in the fax function, for example, the address of a fax transmission destination and/or the transmission method also correspond to setting values.

In addition, when a display position of one of software keys K4, K5, and K6 is touched via the touch panel portion 11 by a user, the operation panel 101 displays a box screen that accepts necessary setting for using the box function. The box function is a function of storing image data in a storage area (for example, a folder provided in the storage portion 113) referred to as a box which is registered in advance, and performing printing based on the stored image data.

Figure 6:
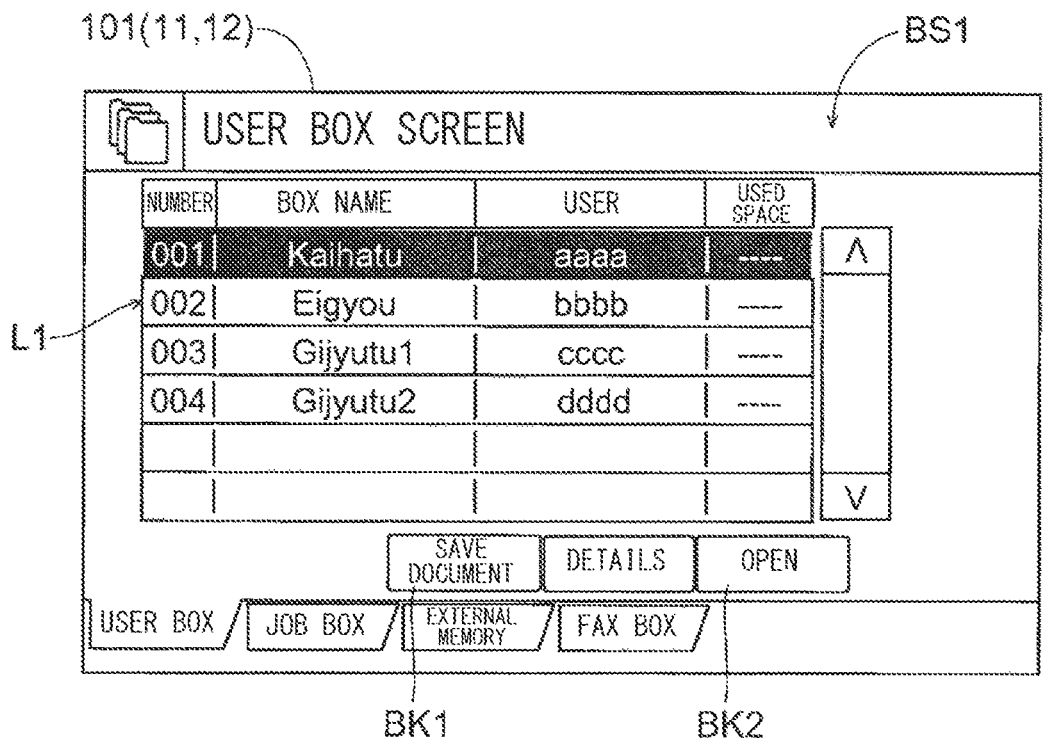
FIG. 6 is a diagram showing an example of a screen (box screen) displayed on the display input device of the image forming apparatus shown in FIG. 1.

For example, when a display position of a software key K4 is touched via the touch panel portion 11 by a user, the operation panel 101 displays a box screen BS1 that accepts necessary setting for using a user box function as shown in FIG. 6. On the box screen BS1, a box list L1 is provided that indicates information (such as a name, a user, and a used space) about registered boxes so as to be arranged in rows on a box by box basis. For example, in order to use a registered box, a user touches a display position of an information indication row corresponding to the desired box via the touch panel portion 11, thereby designating the desired box (for example, on the box list L1, the display color of the information indication row of the designated box inverts). Thereafter, the user touches a display position of a "save document" key BK1 provided on the box screen BS1, via the touch panel portion 11, and then executes scanning (presses the start key 14), thereby storing image data obtained by the scanning into the designated box.

Figure 7:
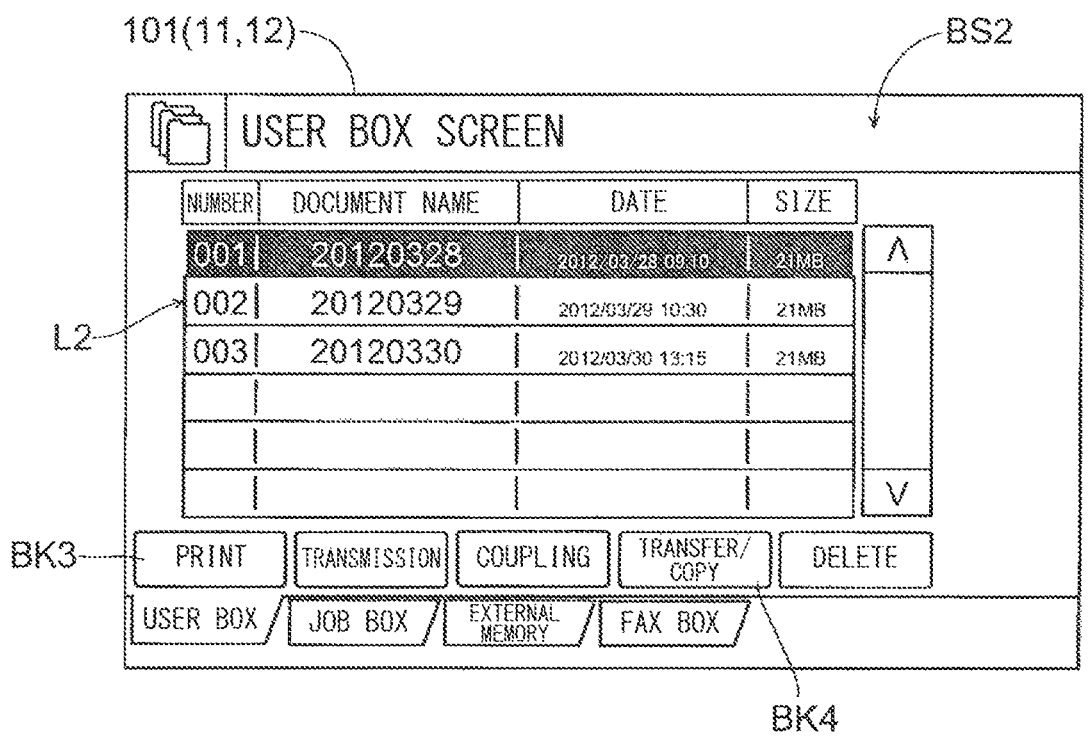
FIG. 7 is a diagram showing an example of a screen (box screen) displayed on the display input device of the image forming apparatus shown in FIG. 1.

In addition, in order to perform printing based on image data stored in a box, a user designates a box for storing the image data to be printed. Thereafter, the user touches a display position of an "open" key BK2 provided on the box screen BS1, via the touch panel portion 11. Thus, the operation panel 101 displays a box screen BS2 as shown in FIG. 7. On the box screen BS2, a data list L2 is provided that indicates information (such as a name, a date, and a size) about the image data stored in the designated box so as to be arranged in rows on a piece by piece basis of image data. Then, the user touches a display position of an information indication row corresponding to the image data to be printed, via the touch panel portion 11, thereby designating the image data to be printed (for example, on the data list L2, the display color of the information indication row of the designated image data inverts). Thereafter, the user touches a display position of a "print" key BK3 provided on the box screen BS2, via the touch panel portion 11, and then executes printing (presses the start key 14), thereby performing printing based on the designated image data.

Returning to FIG. 4, when a display position of the software key K5 is touched via the touch panel portion 11 by a user, the operation panel 101 displays a box screen (not shown) of a job box function. It is noted that in a job box, image data transmitted from the computer 200 is stored. The box screen of the job box function is basically the same as the box screens BS1 and BS2 of the user box function shown in FIGS. 6 and 7. Thus, the user can transmit image data from the computer 200 to the image forming apparatus 100, store therein, and perform printing based on the stored image data.

In addition, when a display position of the software key K6 is touched via the touch panel portion 11 by a user, the operation panel 101 displays a box screen (not shown) of a fax box function. It is noted that a fax box is associated with a fax number (or F code) of a fax transmission source, for example. Then, when the communication portion 120 has received fax data (image data), the fax data is stored into the corresponding fax box. The box screen of the fax box function is basically the same as the box screens BS1 and BS2 of the user box function shown in FIGS. 6 and 7. Thus, the user can store the fax data received by the communication portion 120. In addition, the user can perform printing based on the stored fax data.

In addition, when a display position of a software key K7 is touched via the touch panel portion 11 by a user, the operation panel 101 displays an external memory screen (not shown) that accepts necessary setting for using a function utilizing an external memory (a function of performing printing based on image data stored in the external memory or a function of storing image data into the external memory). On the external memory screen, a data list is provided that indicates information about the image data stored in the external memory so as to be arranged in rows on a piece by piece basis of image data, though not shown. For example, a user touches a display position of an information indication row of image data to be printed, via the touch panel portion 11, thereby designating the image data to be printed. Thereafter, the user executes printing (presses the start key 14), thereby performing printing based on the designated image data. That is, the external memory screen is basically the same as the box screen BS2 of the user box function shown in FIG. 7. Further, in the external memory function, the external memory itself corresponds to a box.

It is noted that a software key K8 is a software key K corresponding to the program function. When a display position of the software key K8 is touched via the touch panel portion 11 by a user, the operation panel 101 displays a program selection screen (not shown) that accepts, from a user, an instruction to select a program to be called among registered programs. It is noted that the program function is a function of registering, as a program, one or more setting items (setting values) selected in advance by a user among a plurality of setting items about functions such as the copy function and/or the transmission (scan) function.

[Operation Method and Display Screen for Transferring Object]

Hereinafter, an operation method and a display screen for transferring an object (icon) displayed on the liquid crystal display portion 12 will be described using the user box function as an example. Here, transfer of an object includes the case of cutting and transferring an object to be transferred, and the case of transferring (copying) a duplicate of an object to be transferred while leaving the object at the original location.

It is noted that examples of objects displayed on the liquid crystal display portion 12 when the user box function is used include an object (for example, referred to as a file icon) representing image data, and/or an object (for example, referred to as a folder icon) having a hierarchic structure and representing a user box. In the description below, an object representing image data is referred to as a file icon B1, and an object representing a user box is referred to as a folder icon B2.

Figure 8:
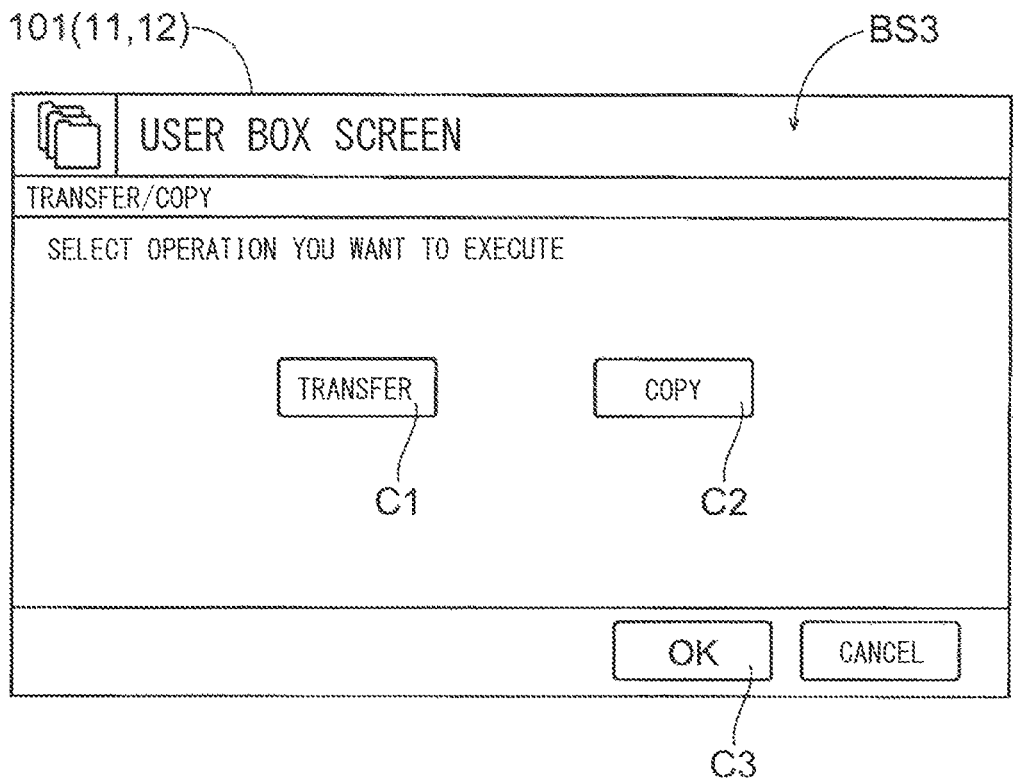
FIG. 8 is a diagram showing an example of a screen (transfer/copy selection screen) displayed on the display input device of the image forming apparatus shown in FIG. 1.

The image forming apparatus 100 according to the present embodiment allows a user to transfer predetermined image data stored in a certain user box to another user box. In other words, the image forming apparatus 100 allows a user to transfer (locate) a predetermined file icon B1 located under a certain folder icon B2, to a location under another folder icon B2. In order to transfer predetermined image data, a user touches, on the box screen BS2 (see FIG. 7), a display position of an information indication row of the predetermined image data, via the touch panel portion 11. Thereafter, the user touches a display position of a "transfer/copy" key BK4 via the touch panel portion 11. In response to this operation, the display control portion 15 causes the liquid crystal display portion 12 to display a transfer/copy selection screen BS3 that accepts an instruction to select whether to transfer or copy the image data, as shown in FIG. 8. Then, if the user desires to transfer the image data, the user touches a display position of a "transfer" key C1 via the touch panel portion 11. On the other hand, if the user desires to copy the image data, the user touches a display position of a "copy" key C2 via the touch panel portion 11. After touching the "transfer" key C1 or the "copy" key C2, the user touches a display position of an "OK" key C3 via the touch panel portion 11.

Figure 9:
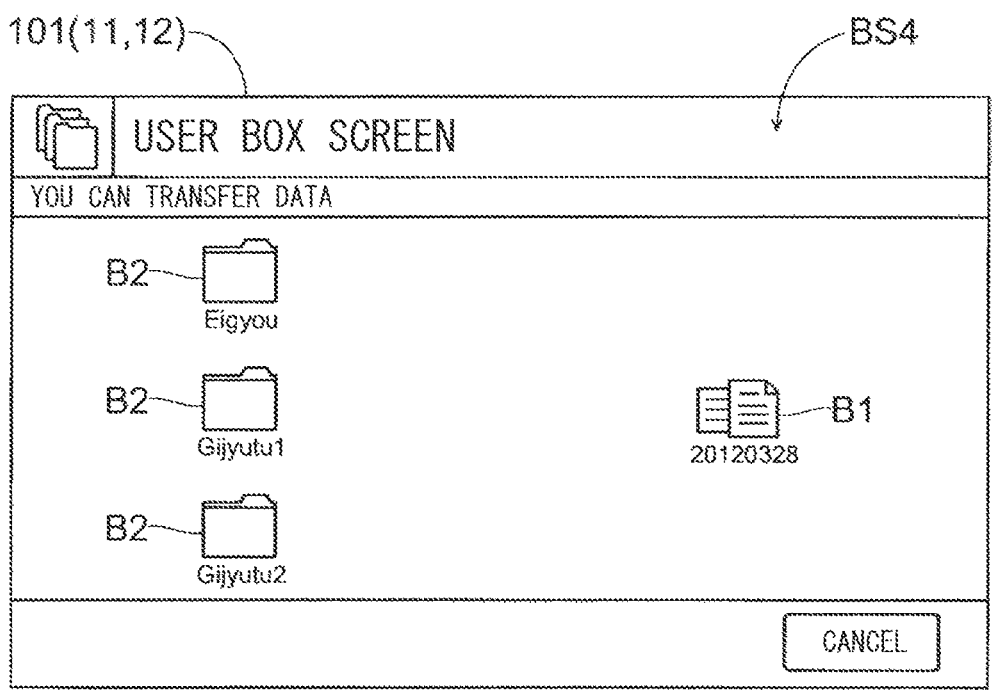
FIG. 9 is a diagram showing an example of a screen (transfer operation accepting screen) displayed on the display input device of the image forming apparatus shown in FIG. 1.

In response to the touching operation on the touch panel portion 11, the display control portion 15 causes the liquid crystal display portion 12 to display a transfer operation accepting screen BS4 as shown in FIG. 9. For example, the liquid crystal display portion 12 displays a file icon B1 to be transferred and folder icons B2 that can be a transfer destination of the file icon B1 to be transferred, on the same screen (the transfer operation accepting screen BS4).

Figure 10:
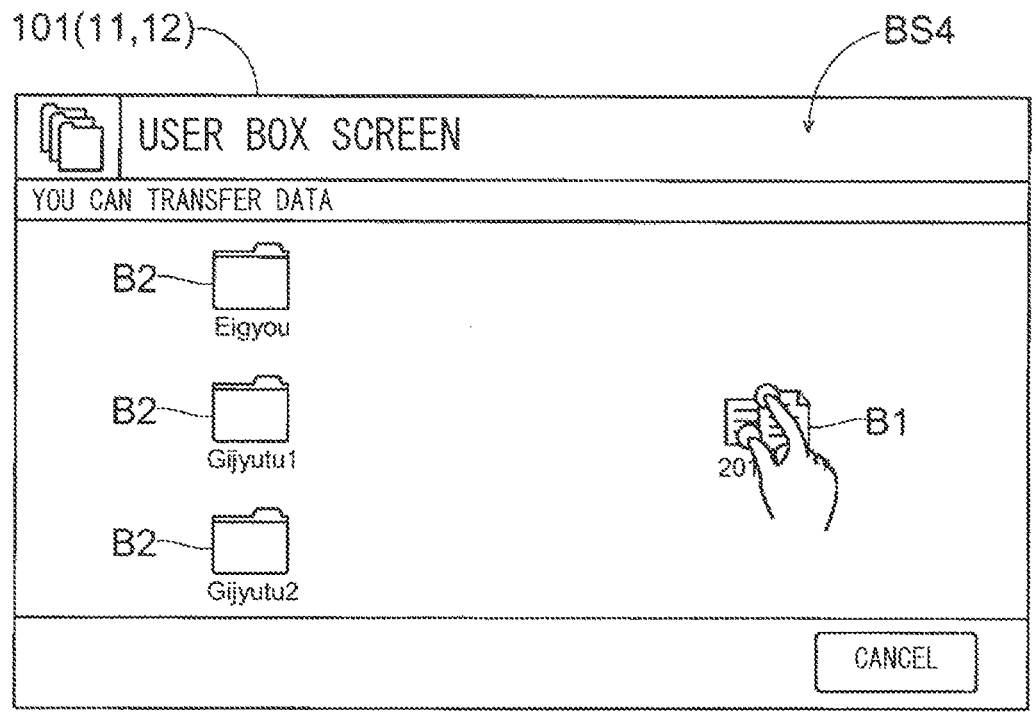
FIG. 10 is a diagram illustrating a touching operation for transferring an object and a screen displayed upon the operation, on the display input device of the image forming apparatus shown in FIG. 1.

After the transfer operation accepting screen BS4 is displayed on the liquid crystal display portion 12, as shown in FIG. 10, the user touches two points at a display position of the file icon B1 on the touch panel portion 11 and keeps this state without taking off fingers from the two touched points. This touching operation is an operation for determining the file icon B1 as a transfer target. It is noted that in FIG. 10, an outlined circle mark indicates a position continuously touched in a fixed manner. In addition, also in FIGS. 11, 12, and 13 referred to later, an outlined circle mark indicates a position continuously touched in a fixed manner.

Figure 11:
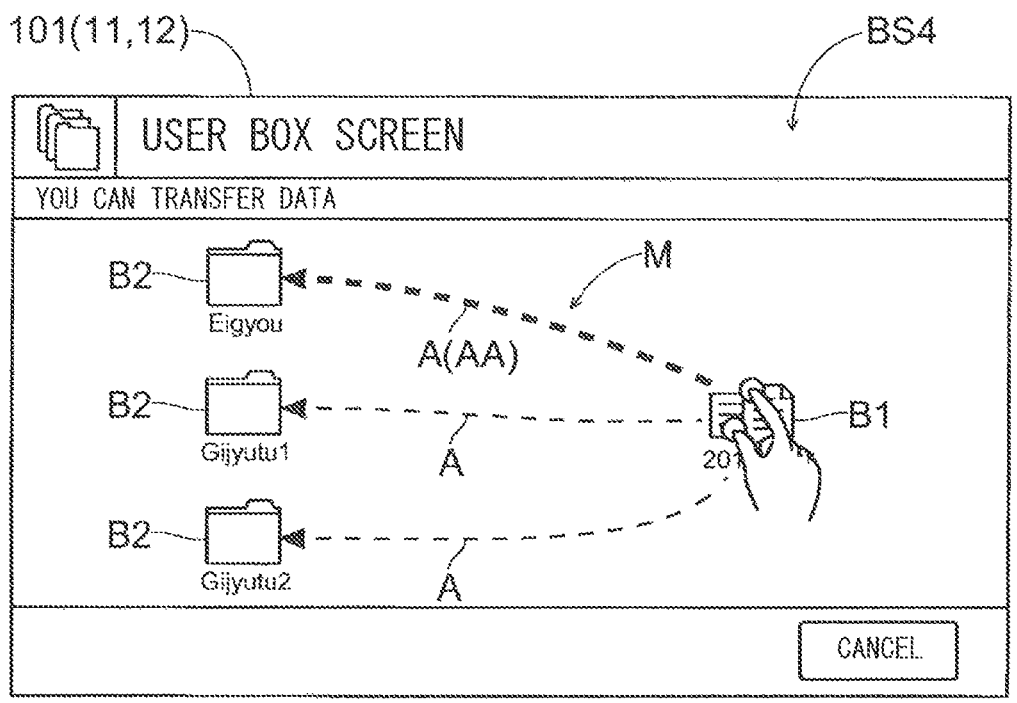
FIG. 11 is a diagram illustrating a touching operation for transferring an object and a screen displayed upon the operation, on the display input device of the image forming apparatus shown in FIG. 1.

When two points are touched on the touch panel portion 11, the display control portion 15 counts time that has elapsed since the two points are touched on the touch panel portion 11. Then, at the time when a predetermined time set in advance has elapsed while the two points keep being touched on the touch panel portion 11, the display control portion 15 determines the file icon B1 displayed at the touched position, as a transfer target. In addition, at this time, as shown in FIG. 11, the display control portion 15 causes the liquid crystal display portion 12 to display a transfer destination designation information image M (corresponding to "transfer destination designation information") indicating which is currently designated as a transfer destination among the folder icons B2 that can be a transfer destination of the file icon B1 to be transferred. In other words, unless the predetermined time has elapsed while the two points keep being touched on the touch panel portion 11 (that is, if at least one point of the two touched points has disappeared before the predetermined time elapses), the display control portion 15 does not cause the liquid crystal display portion 12 to display the transfer destination designation information image M. Thus, it becomes possible to easily realize differentiation from another processing using two-point touching on the touch panel portion 11 as a trigger (processing other than the processing of displaying the transfer destination designation information image M).

The liquid crystal display portion 12 displays arrow images A respectively indicating the folder icons B2 that can be a transfer destination, as the transfer destination designation information image M. Thus, the user can recognize all the folder icons B2 that can be a transfer destination, whereby convenience for the user is enhanced. It is noted that the liquid crystal display portion 12 causes the display manner of the arrow image A corresponding to the folder icon B2 to be designated as a transfer destination among the folder icons B2 that can be a transfer destination, to differ from the display manner of the arrow images A corresponding to the other folder icons B2. In this case, among the arrow images A respectively indicating the folder icons B2 that can be a transfer destination, the display manner of the arrow image A corresponding to the folder icon B2 designated as a transfer destination is different from the display manner of the arrow images A corresponding to the other folder icons B2. Thus, it becomes possible to prevent occurrence of inconvenience that a user cannot identify the folder icon B2 currently designated as a transfer destination. For example, if the arrow image A corresponding to the folder icon B2 currently designated as a transfer destination is an arrow image AA, the line width of the arrow image AA is made larger than those of the other arrow images A. Therefore, in an example shown in FIG. 11, the folder icon B2 at the uppermost position on the screen is a folder icon currently designated as a transfer destination. Here, if the arrow images A have different display colors, it becomes easy to distinguish which folder icon B2 is currently designated by each arrow image A.

Thus, a user can recognize which is currently designated as a transfer destination among the folder icons B2 that can be a transfer destination. Here, a user may desire to transfer the file icon B1 to a folder icon B2 other than the folder icon B2 currently designated as a transfer destination. Therefore, the touch panel portion 11 accepts a transfer destination switching operation which is a touching operation for switching the folder icon B2 to be designated as a transfer destination. The transfer destination switching operation is a touching operation performed while one or more of the two touched points keep being touched on the touch panel portion 11.

Figure 12:
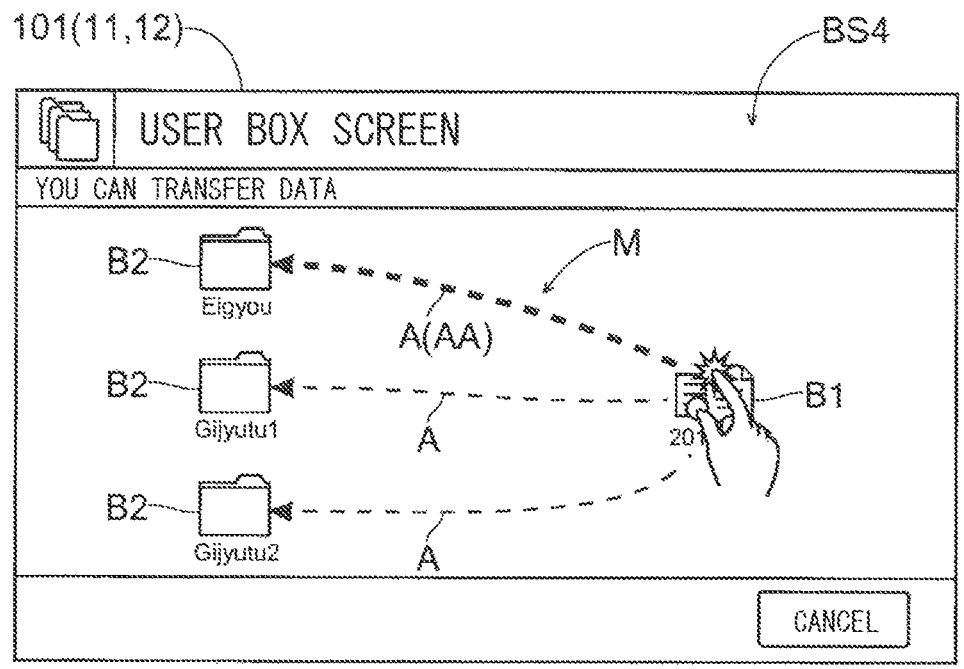
FIG. 12 is a diagram illustrating a touching operation for transferring an object and a screen displayed upon the operation, on the display input device of the image forming apparatus shown in FIG. 1.

As an example, as shown in FIG. 12, after the transfer destination designation information image M is displayed on the liquid crystal display portion 12, when the display control portion 15 has detected a touching operation (tapping operation) of tapping another position of the panel surface with a finger while one of the two touched points keep being touched on the touch panel portion 11, the display control portion 15 determines that the transfer destination switching operation has been performed on the touch panel portion 11. It is noted that in FIG. 12, an outlined star mark indicates a touched position that is tapped. Alternatively, after the transfer destination designation information image M is displayed on the liquid crystal display portion 12, also when the display control portion 15 has detected a touching operation (flicking operation) of flicking a finger at another position of the panel surface while one of the two touched points keep being touched on the touch panel portion 11, the display control portion 15 determines that the transfer destination switching operation has been performed on the touch panel portion 11.

In addition, as another example, though not shown, after the transfer destination designation information image M is displayed on the liquid crystal display portion 12, also when the display control portion 15 has detected a touching operation of moving the touched point of one of the two points while the two points keep being touched on the touch panel portion 11, the display control portion 15 determines that the transfer destination switching operation has been performed on the touch panel portion 11.

Figure 13:
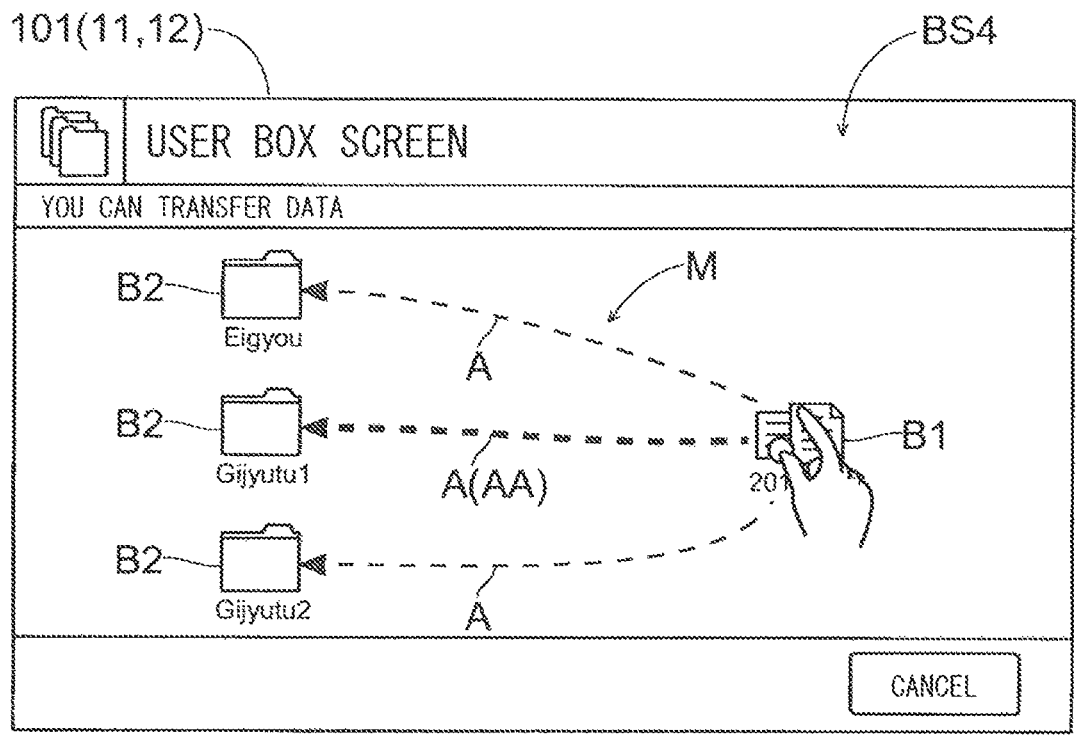
FIG. 13 is a diagram illustrating a touching operation for transferring an object and a screen displayed upon the operation, on the display input device of the image forming apparatus shown in FIG. 1.

When the display control portion 15 has detected that such a transfer destination switching operation has been performed on the touch panel portion 11, the display control portion 15 switches the folder icon B2 to be designated as a transfer destination by the transfer destination designation information image M. For example, as shown in FIG. 13, every time the transfer destination switching operation (such as a tapping operation and/or a flicking operation) is accepted on the touch panel portion 11, the liquid crystal display portion 12 switches one by one the folder icon B2 to be designated as a transfer destination by the transfer destination designation information image M (arrow image AA). It is noted that FIG. 13 shows the state where the transfer destination switching operation has been performed once from the state shown in FIG. 12. In this case, the folder icon B2 at the middle between the two folder icons B2 is designated as a transfer destination.

After performing the transfer destination switching operation, the user confirms that a desired folder icon B2 is designated as a transfer destination (the arrow image AA of the transfer destination designation information image M designates the desired folder icon B2), and finishes the transfer destination switching operation on the touch panel portion 11. That is, the user takes off all the fingers from the touch panel portion 11. It is noted that after displaying the transfer destination designation information image M, until the touching operation on the touch panel portion 11 is released, the liquid crystal display portion 12 continues displaying the transfer destination designation information image M, and switches the folder icon B2 to be designated as a transfer destination by the transfer destination designation information image M (arrow image AA) every time the transfer destination switching operation is accepted by the touch panel portion 11. That is, after the liquid crystal display portion 12 has displayed the transfer destination designation information image M, the user can switch the folder icon B2 to be designated as a transfer destination any number of times as long as the user releases the touching operation on the touch panel portion 11, whereby the convenience for the user is enhanced.

At this time, the display control portion 15 detects that the touching operation on the touch panel portion 11 has been released (the transfer destination switching operation has been finished), and determines, as a transfer destination of the file icon B1 to be transferred, the folder icon B2 having been designated as a transfer destination by the transfer destination designation information image M (arrow image AA) at the time when the touching operation has been released. That is, after the liquid crystal display portion 12 has displayed the transfer destination designation information image M, when the touching operation has been released, the touch panel portion 11 accepts that the folder icon B2 having been designated as a transfer destination by the transfer destination designation information image M (arrow image AA) at the time when the touching operation has been released, has been determined as a transfer destination of the file icon B1 to be transferred.

Figure 14:
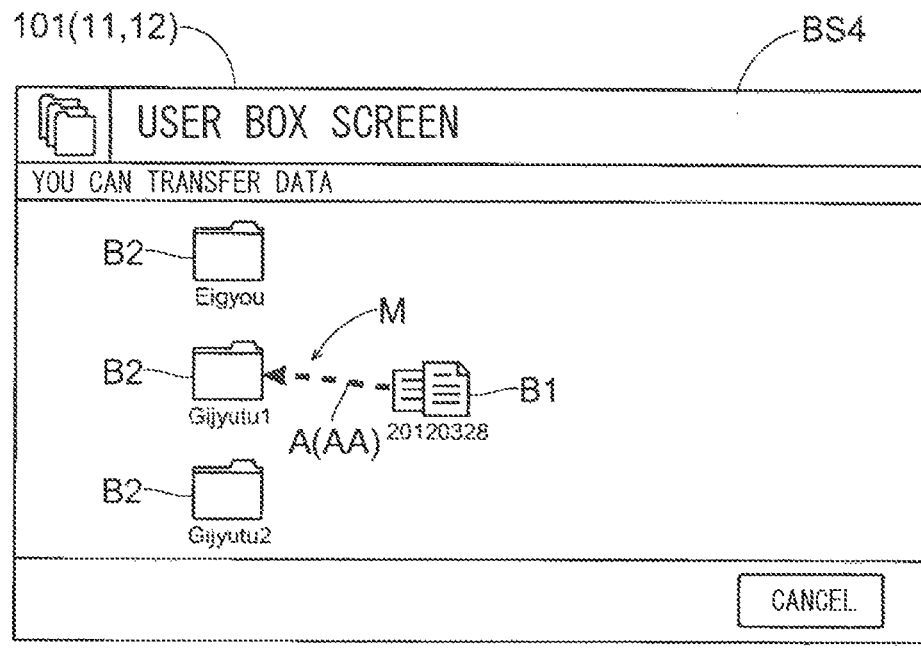
FIG. 14 is a diagram illustrating a touching operation for transferring an object and a screen displayed upon the operation, on the display input device of the image forming apparatus shown in FIG. 1.
Figure 15:
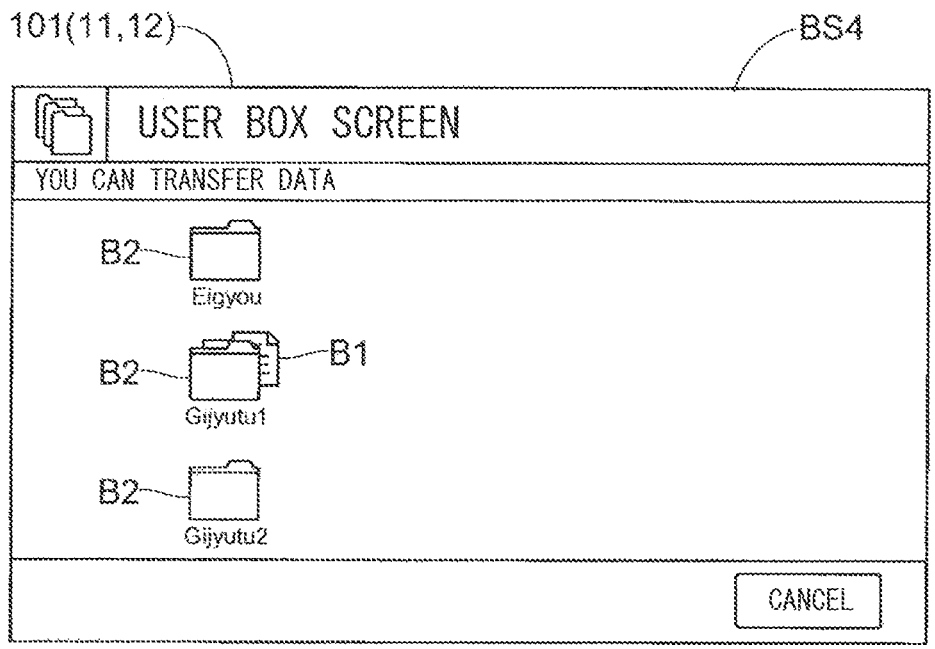
FIG. 15 is a diagram illustrating a touching operation for transferring an object and a screen displayed upon the operation, on the display input device of the image forming apparatus shown in FIG. 1.

When the folder icon B2 as a transfer destination has been determined (the touching operation on the touch panel portion 11 has been released), the display control portion 15 stops displaying the arrow images A other than the arrow image AA as shown in FIGS. 14 and 15. Then, the display control portion 15 causes the liquid crystal display portion 12 to display an animation of gradually moving a display position of the file icon B1 to be transferred toward (along the arrow image AA) a display position of the folder icon B2 determined as a transfer destination. By displaying such an animation, the liquid crystal display portion 12 notifies a user that the file icon B1 to be transferred has been transferred to a location under the folder icon B2 determined as a transfer destination. Thus, the user can easily recognize that the file icon B1 to be transferred has been transferred to a location under the folder icon B2 determined as a transfer destination, whereby the convenience for the user is enhanced.

It is noted that the transfer of an object described above can be also applied to the job box function and the fax box function, and further, applied to the function utilizing the external memory.

[Flow of Process for Transferring Object]

Hereinafter, with reference to a flowchart shown in FIG. 16, the flow of a process for transferring an object will be described using the user box function as an example.

Figure 16:
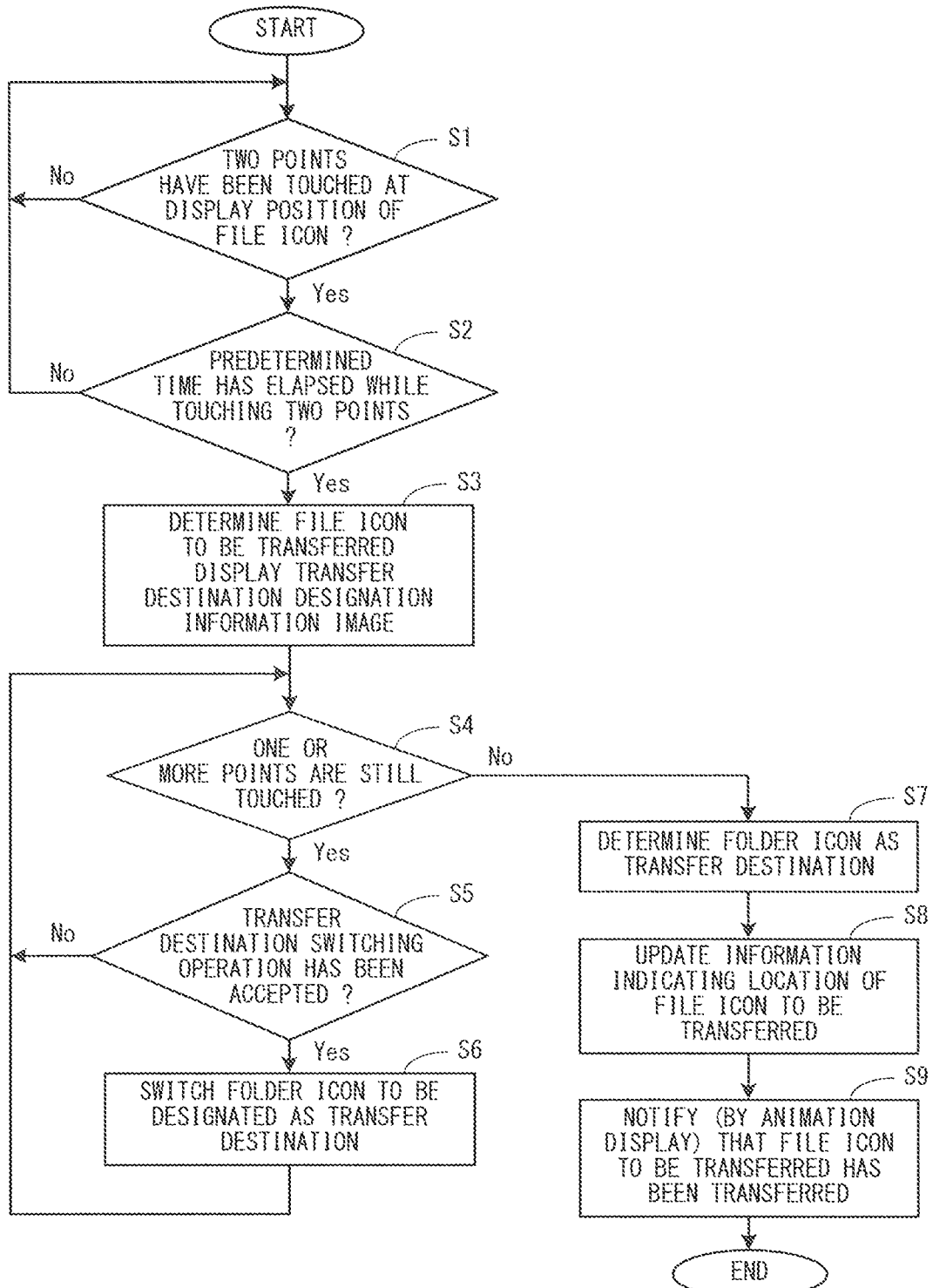
FIG. 16 is a flowchart for explaining an operation for transferring an object on the display input device of the image forming apparatus shown in FIG. 1.

First, the flowchart in FIG. 16 shows the flow of the process in the case where a screen on which a plurality of icons are provided is displayed on the liquid crystal display portion 12. Here, for example, the case where the transfer operation accepting screen BS4 shown in FIG. 9 is displayed on the liquid crystal display portion 12 will be described.

In step S1, the display control portion 15 determines whether or not two points have been touched at a display position of an icon to be transferred among a plurality of icons on the touch panel portion 11. That is, the display control portion 15 determines whether or not two points have been touched at a display position of the file icon B1 on the touch panel portion 11. As a result of the determination, if two points have been touched at the display position of the file icon B1 on the touch panel portion 11, the process proceeds to step S2. On the other hand, as a result of the determination, if two points have not been touched at the display position of the file icon B1 on the touch panel portion 11, the determination in step S1 is repeated.

In step S2, the display control portion 15 determines whether or not a predetermined time has elapsed while the two points keep being touched on the touch panel portion 11. As a result of the determination, if the predetermined time has elapsed while the two points keep being touched on the touch panel portion 11, the process proceeds to step S3. On the other hand, as a result of the determination, if the predetermined time has not elapsed while the two points keep being touched on the touch panel portion 11, the process proceeds to step S1 (causes the liquid crystal display portion 12 to continue displaying the transfer operation accepting screen BS4 as ever).

In step S3, the display control portion 15 determines the file icon B1 displayed at the touched position, as a transfer target. In addition, at this time, the display control portion 15 causes the liquid crystal display portion 12 to display the transfer destination designation information image M indicating which object is designated as a transfer destination among the folder icons B2 that can be a transfer destination of the file icon B1 to be transferred.

In step S4, the display control portion 15 determines whether or not one or more points still keep being touched on the touch panel portion 11 (whether or not the touching operation on the touch panel portion 11 has not been released). As a result of the determination, if one or more points still keep being touched on the touch panel portion 11, the process proceeds to step S5.

In step S5, the display control portion 15 determines whether or not the touch panel portion 11 has accepted the transfer destination switching operation (the touching operation performed while one or more of the two touched points keep being touched after the two points are touched on the touch panel portion 11). As a result of the determination, if the touch panel portion 11 has accepted the transfer destination switching operation, the process proceeds to step S6.

In step S6, the display control portion 15 causes the liquid crystal display portion 12 to switch the folder icon B2 to be designated as a transfer destination by the transfer destination designation information image M. That is, the liquid crystal display portion 12 switches the folder icon B2 to be designated as a transfer destination by the arrow image AA, every time the touch panel portion 11 accepts the transfer destination switching operation. Thereafter, the process proceeds to step S4. It is noted that in step S5, also in the case where the touch panel portion 11 has not accepted the transfer destination switching operation, the process proceeds to step S4. Then, in step S4, if the one or more points are not touched any longer on the touch panel portion 11 (the touching operation on the touch panel portion 11 has been released), the process proceeds to step S7.

In step S7 subsequent to step S4, the display control portion 15 determines, as a transfer destination of the file icon B1 to be transferred, the folder icon B2 having been designated as a transfer destination by the transfer destination designation information image M (arrow image AA) at the time when the touching operation has been released. Then, in step S8, the display control portion 15 updates information indicating the location of the file icon B1 to be transferred.

In step S9, the display control portion 15 causes the liquid crystal display portion 12 to display an animation of gradually moving a display position of the file icon B1 to be transferred toward a display position of the folder icon B2 determined as a transfer destination. By displaying such an animation, the liquid crystal display portion 12 notifies a user that the file icon B1 to be transferred has been transferred to a location under the folder icon B2 determined as a transfer destination.

In the present embodiment, as described above, while the liquid crystal display portion 12 (display portion) is displaying the file icon B1 (object) and the folder icons B2 (objects), when two points are touched at a display position of the file icon B1 on the touch panel portion 11 whereby the file icon B1 to be transferred has been determined, the liquid crystal display portion 12 displays the transfer destination designation information image M (transfer destination designation information) indicating which object is designated as a transfer destination among the folder icons B2 that can be a transfer destination of the file icon B1 to be transferred. Then, when the touch panel portion 11 has accepted the transfer destination switching operation which is a touching operation performed while one or more of the two touched points keep being touched, the liquid crystal display portion 12 (display portion) switches the folder icon B2 to be designated as a transfer destination by the transfer destination designation information image M. In addition, after the liquid crystal display portion 12 has displayed the transfer destination designation information image M, when the touching operation has been released, the touch panel portion 11 accepts that the folder icon B2 having been designated as a transfer destination by the transfer destination designation information image M at the time when the touching operation has been released, has been determined as a transfer destination of the file icon B1 to be transferred. Thus, it becomes unnecessary to perform a touching operation (for example, drag-and-drop operation) of moving the touched position from a display position of the file icon B1 to be transferred toward a display position of the folder icon B2 that is a transfer destination. That is, in order to transfer the file icon B1, after performing a touching operation of determining the file icon B1 to be transferred (a touching operation of touching two points at a display position of the file icon B1 to be transferred) on the touch panel portion 11, a user only needs to perform the transfer destination switching operation continuously at the same position or take off all the finger from the touch panel portion 11, whereby the user can transfer the file icon B1 to be transferred. Therefore, the user hardly needs to move the wrist. As a result, upon a touching operation of transferring the file icon B1 displayed on the liquid crystal display portion 12, a burden on the user can be reduced and the operability can be improved.

It is to be understood that the embodiments herein are illustrative and not restrictive, since the scope of this disclosure is defined by the appended claims rather than by the description preceding them, and all changes that fall within metes and bounds of the claims, or equivalence of such metes and bounds thereof are therefore intended to be embraced by the claims.

The invention claimed is:

1. A display input device comprising:
a display portion that displays a screen on which a plurality of objects are provided, the plurality of objects including an object to be transferred, and an object having a hierarchic structure such that the object to be transferred can be transferred and located thereunder; and
a touch panel portion that is provided on the display portion and detects a plurality of touched positions that a user is touching, wherein
the display portion, while displaying the plurality of objects,
when two points are touched at a display position of the object on the touch panel portion the object to be transferred has been determined, displays transfer destination designation information indicating which object is designated as a transfer destination among the objects that can be a transfer destination of the object to be transferred, and
when the touch panel portion has accepted a transfer destination switching operation which is a touching operation performed while one or more of the two touched points keep being touched, switches the object to be designated as a transfer destination by the transfer destination designation information,
the touch panel portion, after the display portion has displayed the transfer destination designation information, when the touching operation has been released, accepts that the object having been designated as a transfer destination by the transfer destination designation information at the time when the touching operation has been released, has been determined as a transfer destination of the object to be transferred,
the object to be transferred is a file icon,
the object having the hierarchic structure is a folder icon,
the display portion, after displaying the transfer destination designation information,
continues displaying the transfer destination designation information until the touching operation on the touch panel portion is released, and
switches the object to be designated as a transfer destination by the transfer destination designation information, every time the touch panel portion accepts the transfer destination switching operation, and
the display portion
displays arrow images respectively indicating the objects that can be a transfer destination, as the transfer destination designation information, and causes a display manner of the arrow image corresponding to the object to be designated as a transfer destination among the objects that can be a transfer destination, to differ from a display manner of the arrow images corresponding to the other objects.

2. The display input device according to claim 1, wherein the display portion
when a predetermined time set in advance has elapsed while the two points keep being touched at the display position of the object on the touch panel portion, displays the transfer destination designation information, and
unless the predetermined time has elapsed while the two points keep being touched at the display position of the object on the touch panel portion, does not display the transfer destination designation information.

3. The display input device according to claim 1, wherein the display portion, after displaying the transfer destination designation information, when the touching operation on the touch panel portion has been released, displays an animation of gradually moving the display position of the object to be transferred toward a display position of the object determined as a transfer destination.

4. The display input device according to claim 1, wherein the touch panel portion accepts, as the transfer destination switching operation, a touching operation of, while keeping one of the two touched points being touched, tapping another position on the touch panel portion with a finger.

5. The display input device according to claim 1, wherein the touch panel portion accepts, as the transfer destination switching operation, a touching operation of, while keeping one of the two touched points being touched, flicking a finger at another position on the touch panel portion.

6. The display input device according to claim 1, wherein the touch panel portion accepts, as the transfer destination switching operation, a touching operation of, while keeping the two points being touched, moving the touched position of one of the two touched points.

7. An image forming apparatus comprising:
a display portion that displays a screen on which a plurality of objects are provided, the plurality of objects including an object to be transferred, and an object having a hierarchic structure such that the object to be transferred can be transferred and located thereunder; and
a touch panel portion that is provided on the display portion and detects a plurality of touched positions that a user is touching, wherein
the display portion, while displaying the plurality of objects,
when two points are touched at a display position of the object on the touch panel portion the object to be transferred has been determined, displays transfer destination designation information indicating which object is designated as a transfer destination among the objects that can be a transfer destination of the object to be transferred, and
when the touch panel portion has accepted a transfer destination switching operation which is a touching operation performed while one or more of the two touched points keep being touched, switches the object to be designated as a transfer destination by the transfer destination designation information,
the touch panel portion, after the display portion has displayed the transfer destination designation information, when the touching operation has been released, accepts that the object having been designated as a transfer destination by the transfer destination designation information at the time when the touching operation has been released, has been determined as a transfer destination of the object to be transferred,
the object to be transferred is a file icon,
the object having the hierarchic structure is a folder icon,
the display portion, after displaying the transfer destination designation information,
continues displaying the transfer destination designation information until the touching operation on the touch panel portion is released, and
switches the object to be designated as a transfer destination by the transfer destination designation information, every time the touch panel portion accepts the transfer destination switching operation, and
the display portion
displays arrow images respectively indicating the objects that can be a transfer destination, as the transfer destination designation information, and
causes a display manner of the arrow image corresponding to the object to be designated as a transfer destination among the objects that can be a transfer destination, to differ from a display manner of the arrow images corresponding to the other objects.

8. The image forming apparatus according to claim 7, wherein
the display portion
when a predetermined time set in advance has elapsed while the two points keep being touched at the display position of the object on the touch panel portion, displays the transfer destination designation information, and
unless the predetermined time has elapsed while the two points keep being touched at the display position of the object on the touch panel portion, does not display the transfer destination designation information.

9. The image forming apparatus according to claim 7, wherein
the display portion, after displaying the transfer destination designation information, when the touching operation on the touch panel portion has been released, displays an animation of gradually moving the display position of the object to be transferred toward a display position of the object determined as a transfer destination.

10. The image forming apparatus according to claim 7, wherein
the touch panel portion accepts, as the transfer destination switching operation, a touching operation of, while keeping one of the two touched points being touched, tapping another position on the touch panel portion with a finger.

11. The image forming apparatus according to claim 7, wherein
the touch panel portion accepts, as the transfer destination switching operation, a touching operation of, while keeping one of the two touched points being touched, flicking a finger at another position on the touch panel portion.

12. The image forming apparatus according to claim 7, wherein
the touch panel portion accepts, as the transfer destination switching operation, a touching operation of, while keeping the two points being touched, moving the touched position of one of the two touched points.

* * * * *